May 1, 1951 G. W. ANGELL ET AL 2,551,083

ANSWER RECORDER FOR EXAMINATION QUESTIONS

Filed Aug. 22, 1947

INVENTOR.
GEORGE W. ANGELL
and MAURICE E. TROYER
BY Bodell & Thompson
ATTORNEYS

Patented May 1, 1951

2,551,083

UNITED STATES PATENT OFFICE 2,551,083

ANSWER RECORDER FOR EXAMINATION QUESTIONS

George W. Angell and Maurice E. Troyer, Syracuse, N. Y.

Application August 22, 1947, Serial No. 770,201

1 Claim. (Cl. 35—9)

This invention relates to answer recorders for examination questions of the so-called true-false, best answer, or multiple choice type, and other objective-type items, and has for its object a recorder in which the recording punch board and indicia sheets are loose, or not held or bound together at their edges, but when brought together are held assembled and in juxtaposition to each other by a permanent wrapper or base plate so that one base plate and punch sheet can be repeatedly used with different blank and indicator sheets, and the sheets readily assembled loosely and yet be accurately located when placed in the wrapper or base plate.

The invention consists in the novel features and in the combinations and constructions hereinafter set forth and claimed.

In describing this invention, reference is had to the accompanying drawings in which like characters designate corresponding parts in all the views.

Figure 1:
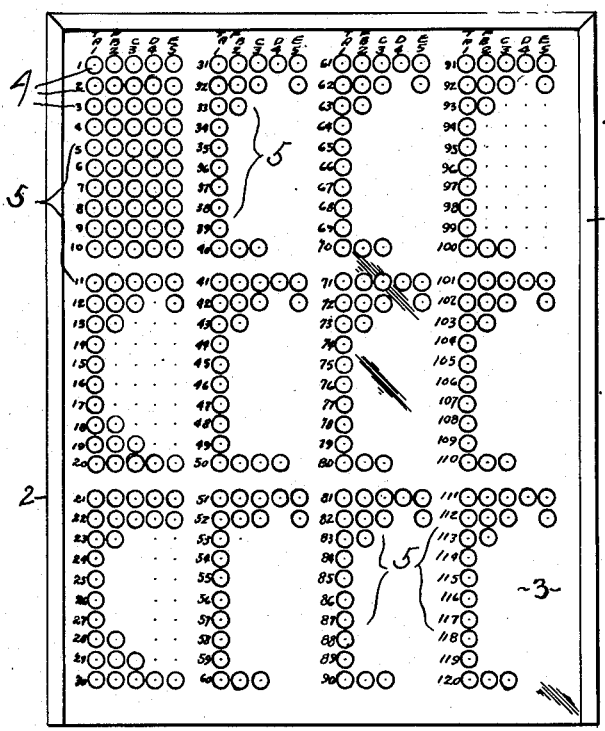
Figure 1 is a plan view of this recorder.
Figure 2:
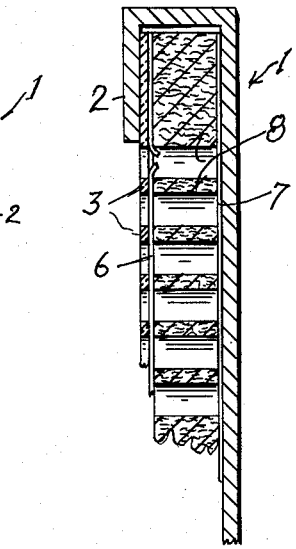
Figure 2 is an enlarged sectional view, partly broken away, of parts seen in Figure 1.
Figure 3:
Figure 3 is an edge view partly broken away.
Figure 4:
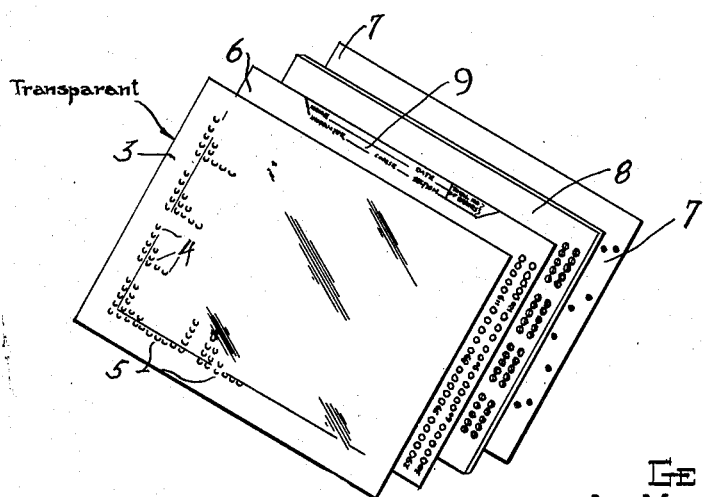
Figure 4 is an isometric view showing the blank or recorder sheet, punch board, and the answer sheet as separated, Figure 4 also showing a cover sheet which may be displaceable with the other or inserted sheets.

The invention comprises, generally, an answer recorder including a base or envelope having means for holding loosely packed insert sheets in juxtaposition to each other without the use of binders, or any means for forming them into a pad.

I designates a body or holder which may be formed up of any rigid material, as aluminum, it being in the form of a rectangular plate having overhanging flanges 2 along three sides thereof which provide inwardly facing guide channels for the margins of the inserted sheets, the fourth side of the plate being open for permitting the insertion and removal of the sheets.

The holder I also includes a cover or top sheet 3 which may be, and usually is, removable with the insert sheets, and is held in position by the flanges 2. The top or cover sheet 3 is formed with consecutive rows 4 of perforations arranged in a column 5, there being one row of perforations for each question. The perforations of each row are also consecutively designated. As here shown, each row 4 contains five perforations. It will be understood that the questions give the student the choice of selecting one of five propositions stated in the question, as the correct answer to the question, the propositions in the questions being numbered 1 to 5, as are the perforations of each row. The propositions may be designated A, B, C, D and E, and the perforations may be so designated. If the propositions of the question are identified by the numerals 1 to 5, the student uses the numbers along the rows of perforations. If the propositions of each question are designated A to E, the student is guided by the letters identifying the perforations of each row. As here illustrated, the cover or top sheet 3 is formed with four columns, each column containing thirty rows of perforations. The columns are designated 5.

The cover sheet 3 may be of transparent material and the designations for the rows and columns are on the blank sheet 6. The blank sheet 6 underlies the top sheet 3 and preferably has circumscribed areas for alinement with the perforations in the top sheet 3.

The numeral 7 designates the code or answer sheet having indicia, one for each row of perforations, the indicia being located to be in alinement with the one of the perforations of the cover sheet 3 alined with the correct answer, there being one indicia for each row and the indicia indicating the correct answer when the proper hole is punched through the blank sheet with a suitable instrument. If the pupil does not select the correct answer, the portion of the answer sheet not having the indicia is visible through the punched hole, as will be understood. The indicia may be colored spots, checks, crosses, or any other designation or, in case the student is to be credited with a nearly correct, or a near-miss answer, the indicia may be different colored spots, as red indicating the correct answer, and blue a near-miss answer for which credit is given.

8 designates the punch board sheet interposed between the blank sheet and the answer sheet and having punch holes therein alined with the perforations of the top sheet 3. The punch sheet is thick enough to give sufficient clearance for a hole to be punched through the blank sheet and expose the indicia sheet. As the top sheet 3 is here shown as transparent, the designations for the rows and columns are printed on the blank sheet. Also, the blank sheet is provided with a space 9 for the name of the student, and other data.

In use, the answer sheet for the list of questions is assembled with the blank sheet and the interposed punch sheet and these are of the same area as each other and as the base plate I, or of such width as to be guided and held in juxtaposition to each other and to the cover sheet 3, by the guide channels formed by the flanges 2 along the sides of the base plate. The advance end margins of the sheets extend under the flange 2 along the top edge of the base plate, but the flange along the top edge may be omitted. Usually, the cover sheet is initially stacked with the insert sheets and then the four sheets inserted as a unit in the channels of the base 1. In either manner of assembly, the base plate locates and holds the loose or separate insert sheets in juxtaposition to each other and to the top sheet 3, or the perforations therein.

Owing to this construction, not only are the sheets firmly held in juxtaposition to each other, but they can not be easily removed without detection. Or, in other words, it is difficult for a student to slip out the answer sheet without being detected.

What we claim is:

An answer recorder for examination questions comprising a flat body plate formed with marginal inwardly facing channels along opposite edges thereof, and a series of loose sheets of substantially the same area slidable into the channels, the channels serving to hold the sheets in juxtaposition to each other, said sheets including a top sheet having consecutively numbered rows of selective perforations arranged in a column, one row of perforations for each question, a recording sheet underlying the top sheet, this being blank and having circumscribed areas for alinement with the perforations of the top sheet, an answer indicating sheet underlying and spaced from the blank sheet and having indicia in alinement with one perforation of each row of perforations in the top sheet, and a board provided with punch holes located between the blank and the answer indicating sheets, providing a space for the punching from the blank sheet so that the answer sheet is clearly visible through the punched out hole in the blank sheet, the punch holes thereof being in line with the perforations of the top sheet and the indicia of the indicia sheet, each sheet being of the same area as the body plate so that the assembly of loose sheets slidably fit the channels therein.

GEORGE W. ANGELL.
MAURICE E. TROYER.

REFERENCES CITED

The following references are of record in the file of this patent:

UNITED STATES PATENTS

| Number | Name | Date |
| --- | --- | --- |
| 1,644,160 | Thompson | Oct. 4, 1927 |
| 1,797,744 | Wiley | Mar. 24, 1931 |
| 1,842,470 | Brownlee | Jan. 26, 1932 |